United States Patent Office 3,362,831
Patented Jan. 9, 1968

3,362,831
ARTIFICIAL FRUITS AND VEGETABLES
Alina S. Szczesniak, Yonkers, N.Y., assignor to General Foods Corporation, White Plains, N.Y., a corporation of Delaware
No Drawing. Filed Dec. 19, 1966, Ser. No. 602,567
25 Claims. (Cl. 99—131)

This application is a continuation-in-part of patent applications Ser. No. 165,678, filed Jan. 11, 1962, now abandoned and 435,050, filed Feb. 24, 1965, now abandoned.

This invention relates to the production of artificial fruits and vegetables which resemble closely the products of nature in cellular structure, appearance and textural characteristics. Previously known artificial fruits, for example, such as disclosed in U.S. Patent 2,403,547 to Peschardt, which is typical of the prior art, are nothing more than non-cellular firm jellies having a hard skin and a soft center. Such products do not have the essential textural and taste characteristics required to simulate the taste of fresh natural fruit. Moreover, they cannot be used in recipes which call for cooking due to the loss of desirable textural characteristics upon heating.

More recently the synthesis of artificial bone structure has been reported by Dr. Heinrich Thiele and others of the Department of Colloid Chemistry at Kiel University, Kiel, Germany. Some of this work is described in the German periodical "Kolloid Zeitschrift," volume 156, pages 14–21 (1958). These workers have discovered that artificial tissues having a uniform microscopic cellular structure close to that of animal bone can be produced by the dialysis or diffusion of metal ions into an alginate sol. The tissues or textures produced by this method are very hard and brittle and exhibit many of the important characteristics of animal bone. For example, the product is hard, unchewable, and gristle-like, and has a uniform cell size of about 200 microns. None of the artificial textures produced by the Thiele et al. process can be said to resemble plant-like structures such as natural fruits and vegetables. Plants and fruits exhibit a much larger or more open cellular structure and present unique problems when sought to be produced by artificial means. These problems are magnified when one considers that such products must be edible and must simulate essential cellular characteristics of natural fruits and vegetables, such as textural crunchiness, juiciness and tenderness.

It is an object of the present invention to produce edible alginate gels which have a crisp yet tender texture which simulates the texture of natural fruits and vegetables.

It is another object of the present invention to produce artificial fruits and vegetables which possess textural characteristics and flavor of natural products in combinations heretofore not encountered in nature.

It is another object of the present invention to prepare artificial fruits and vegetables which, unlike natural fruits and vegetables, may be heated or cooked without losing their characteristic crunchiness or crisp texture.

It is another object of the present invention to prepare artificial fruits and vegetables which, unlike many natural fruits and vegetables, may be preserved for long periods of time by low temperature freezing methods without losing their original textural characteristics.

It is still a further object of the present invention to produce predetermined geometrical and mechanical properties in artificial cellular textures by the addition of various modifying substances to the gel system.

The present invention is founded on the discovery that non-uniform cellular structures may be prepared by dialyzing certain alkaline earth metal salts, such as the acid salts of calcium or magnesium, preferably the weak acid salts, at a uniform rate into an aqueous sol of a water soluble alginate salt of suitable viscosity and concentration by supplying an even front of metal ions which react with the alginate sol at its interface to produce a thin surface film which serves as a dialysis membrane for the subsequent reacting ions. This gradual and uniform gel formation serves to produce an edible, crisp non-uniform cellular network which simulates the textural characteristics of fruits and vegetables found in nature as well as novel combinations thereof.

In the absence of a freeze-thaw cycle the cellular network will have vegetable characteristics. If the cellular network is subjected to a freeze-thaw cycle, the resulting product will have fruit properties. The vegetable product, that is, one which has not been subjected to a freeze-thaw cycle, has cell walls which do not exhibit birefringence, whereas the fruit product, that is, one which has been subjected to a freeze-thaw cycle, has birefringent cell walls. The vegetable product has a cell size varying from about 0.1 mm. to about 0.2 mm. and a less random distribution of cellular size than the fruit product. The fruit product has larger cells than the vegetable product, varying up to about 3 mm. and a wider distribution, at least 50% of the cells in the fruit product having a size ranging from about 0.1 mm. to about 0.7 mm.

The freezing step of the freeze-thaw cycle crystallizes the water content distributed throughout the gel into an expanding ice structure which expands the cellular walls while at the same time subjecting them to mild rupture. This gives a final product which on thawing is very fruit-like in textural appearance and mouthfeel and has an organized molecular arrangement in the "cell wall" structures similar in microscopic appearance and birefringence to natural plant tissue. Freezing has to proceed slowly and uniformly throughout the entire structure, so that no part of the artificial product freezes significantly faster than another part. If the latter situation occurs, the product will have a distorted structure and an undesirable spongy texture.

The dialysis reaction of this invention proceeds at a slow and uniform rate. When calcium lactate is used as the source of calcium ions, the average rate of diffusion of the calcium solution into the alginate sol should not exceed about 23 mg. of calcium ions per gram of sodium alginate sol per hour; when using calcium acetate as the source of the calcium ions, the average rate of diffusion should not exceed about 33 mg. of calcium ions per gram of sodium alginate sol per hour. At these diffusion rates the binding of the calcium ion to the alginate molecule occurs at a rate of from about 5.6 mg. to about 9.5 mg. of calcium ions per gram of alginate sol per hour. In general, the diffusion should be carried out at rates which will permit from about 3.5 mg. to about 11.5 mg. of calcium ions to bind with one gram of alginate sol per hour. The amount of calcium bound in the final gel structure can vary from about 0.23 to about 0.67 equivalent of calcium per equivalent of alginate depending upon the firmness desired in the final product. The preferred range is between about 0.61 to 0.67 equivalent of calcium per equivalent of alginate since the texture of most fruits and vegetables prepared in this concentration range very closely resembles the texture of their natural counterparts. In certain cases, for example, when additives are employed as will be discussed below, the diffusion rates may be less than those given above. With other calcium salts, e.g., calcium chloride, calcium propionate or calcium sulfate, the diffusion rates may differ somewhat from those mentioned for calcium lactate or calcium acetate. The uniform rate of dialysis is brought about in practice by supplying a reacting interface formed by the uniform contact of two solutions, one solution being the gellable alginate sol, the other solution being the gelling metal ion solution. The term "natural dialysis membrane" is used to define the insoluble alginate film formed at the interface. The exact time of reaction, of course, depends on the desired size and thickness of the final product. The reacting interface must be initially distinct and separate to supply an even front of reacting ions which forms the natural dialysis membrane of insoluble alginate gel.

In forming this natural dialysis membrane of insoluble alginate it is preferable to use an artificial dialysis membrane, i.e., a dialysis membrane other than the natural dialysis membrane defined above, such as a sheet of cellophane, nylon cloth, fine mesh wire screen, or some other type of artificial dialysis membrane. The physical separator accomplishes the prerequisite of separating the two solutions along a uniformly distinct interface so as to allow the formation of a thin film of insoluble alginate which gels progressively inward by the action of migrating metal ions until gelation is finally completed throughout the alginate sol giving a final product which is very fruit-like or vegetable-like in textural characteristics. Since the true dialysis membrane for this process is the natural insoluble alginate film formed in situ at the interface, it is understood that the use of an artificial dialysis membrane is not essential to the success of the present invention and that satisfactory results can be obtained by careful techniques of contacting the two solutions so as to preserve an even and uniform reacting interface, which will allow a thin uniform film of insoluble alginate to be initially formed.

The textural characteristics of the vegetable-like and fruit-like products of this invention can be varied by a number of factors. Among the most important of these factors are the type and concentration of the alginate salt, the type and concentration of the alkaline earth metal salt, and also the type and concentration of the various additives which are used to modify the gel characteristics. Different additives are very effective in changing the hardness, crunchiness, tenderness, mealiness, chewiness, over-all mouthfeel and other textural qualities of the final product. Among the additives that may be used to modify the gel characteristics to simulate certain fruits and vegetables are additives taken from the generic groups of acids, lower molecular weight polysaccharides, starches, fats, edible higher alcohols, proteins and vegetable gums. These additives may be present at levels up to about 25% of the total weight of the alginate sol. Lower molecular weight sugars may be used both to modify the textural properties and also to act as flavoring materials. Different additives can be selectively chosen to produce predetermined cellular structures which resemble the textural properties of potatoes, water chestnuts, turnip, melon, cucumber, apples, pears, honeydew, watermelon and other fruits and vegetables which occur in nature. The additives can also be selectively chosen to produce cellular textures which represent combinations of desirable characteristics not presently found in nature.

The cell size of the products of this invention will be found to vary with the type of the reacting salt used. However, it is a feature of this invention that the final textures formed during gelation will, as general rule, in the absence of a freeze-thaw cycle be characterized by a tightly closed non-uniform cellular structure which will resemble the textural characteristics of a vegetable product more closely than that of a fruit product. Therefore, regardless of the acid salt used, it is an embodiment of this invention that the production of fruit-like textural products will necessarily involve the step of a uniform and controlled freezing cycle at a temperature below 32° F. Moreover, a system composed only of a metal salt, alginate, and water, which has been subjected to a gelling and freezing operation to form a more open cellular structure, will be found to have a tough, dry, but still edible cellular texture. It is therefore a preferred embodiment of this invention to incorporate certain additives or gel modifiers in the alginate sol prior to the dialysis reaction. In this manner an artificial fruit-like body is achieved which has a uniform texture containing liquid filled cells which are more open, tender, and moist. The type and concentration of additives is very important in the production of the fruit-like products of this invention. Among the particular additives found effective for the production of artificial fruit-like products are gum tragacanth, malic acid, corn syrup sweeteners, and wheat starch. The general classes or groups of additives which can be used are lower polysaccharides, starches, proteins, fats and gums. Utilizing these systems in the dialysis-freeze-thaw process of the present invention, natural fruit textures and combinations thereof may be closely duplicated in the case of apple, pear, watermelon, honeydew melon, as well as other fruits.

In this discussion it is understood that the gel formation reaction should proceed at a moderate temperature which does not interfere with the gradual and gentle formation of the insoluble gel structure. Typically, this temperature is that of room temperature. Temperatures above the range of from about 35° F. to about 90° F. give a disorganized fibrous structure having distinct layers of gel which make the textures much less desirable from an edible standpoint.

The manufacture of artificial vegetable textures can be practiced in accordance with this invention by preparing separate solutions of alginate and an alkaline earth metal ion. The solutions are then contacted according to the aforesaid described method. The alginate sol is formed from a water-soluble alginic acid salt such as sodium, potassium, or ammonium with the sodium salt being preferred. For certain effects, mixtures of different soluble alginic acid salts are desirable. Alginates having a uniform chain-length characterized by an apparent viscosity of from about 100 to about 500 centipoises as determined by methods normally used in the gum industry are preferred, although alginates having an apparent viscosity as high as about 900 centipoises can be used. The preferable concentration range for the alginate is from about 2% to about 3%, although a range as low as about 0.5% and as high as about 5% may be practiced. In the case of the metal ion solution calcium is the preferred cation and acetate and lactate are the preferred anions. The preferable concentration is from about 3% to about 6% for the reacting ion solution although a concentration as high as 12% can be practiced if a very hard and brittle vegetable structure is desired. Within the range of from about 3% to about 6% calcium salt solution and from about 2% to about 3% alginate sol (having a viscosity of from about 100 to about 500 centipoises), the cellular structure formed is tender yet crunchy and quite close to that of a typical vegetable texture. The higher ranges of calcium salt give a firmer and crunchier vegetable texture. In any event, a 5% reacting salt solution appears optimum. In general, magnesium salts produce softer structures, but may be used to achieve certain desired effects. Mixtures of calcium and magnesium salts are also found useful.

The dialysis reaction is preferably started by the use of the above mentioned artificial dialysis membrane which separates the two reacting solutions and allows an even front of reacting metal ions, such as calcium, to enter the alginate sol in a dialysis fashion. This membrane can vary in pore size as long as the interface of the two solutions is initially kept distinct, even, and uniform. While the degree of wettability of different artificial dialysis membranes has some influence on the initial gel formation, this is quite negligible and once the insoluble alginate membrane or film is formed it controls the rate of dialysis. Throughout the gelling process the migration of gelling ions will be constant and uniform. The openings in the artificial dialysis membrane can be quite large, a 100 mesh wire screen being suitable, but for the purpose of this invention a Visking dialysis membrane having a pore size of about 30 A. is preferred. The artificial dialyzing membrane can take the form of a multi-directional dialyzing membrane of the tubular or "sausage" type, if a circular arrangement of cells is desired in the final product. If a rectangular arrangement of the cells is preferred, one-directional or two-directional dialysis may be used. The latter employs one membrane at the top of the soluble alginate solution and another membrane at the bottom of the soluble alginate solution. The alginate solution is confined in a ring shaped vessel, the height and diameter of which are defined by the desired size of the final product. The solution of the gelling alkaline earth metal ion is placed in two suitable vessels so that it contacts both the upper and the lower membranes. The one-directional dialysis is performed in a similar manner except that the vessel containing the alginate solution has only one opening which is covered by a suitable artificial dialyzing membrane. This opening may be on the top, the bottom or the side of the vessel. The former is preferred for convenience of manipulation, but other positions of the opening may be used to produce equally desirable final textures. It should also be borne in mind that omission of the artificial membrane altogether is feasible, provided proper precautions are executed in contacting the reacting solutions.

Although not as essential as with fruit-like textures, the use of additives in the basic alginate system is also desirable in the production of vegetable-like textures. Without the additives, the alginate gel formed according to the process of the present invention has the textural characteristics and the mouthfeel closely resembling that of a natural cucumber. When substances such as gum tragacanth or cooked starch paste, for example, are added to the alginate sol prior to gelation, the texture formed upon dialysis is made softer and more tender and can be said to resemble the texture of heat treated turnips. Another reason for the desirability of employing suitable additives in the production of vegetable-like textures is that in the preservation of the vegetable textures by freezing at temperatures below 32° F., the vegetable-like arrangement of cells is disrupted and made more open. Upon thawing, this structure is very much different from the characteristic tightly closed cellular structure of vegetables. Therefore, it is a feature of this invention to prevent this change during freezing of the textures by the incorporation of an inhibiting colloid, such as pectin, which prevents the enlargement of the cellular openings. In the case of pectin, the additive should be present in at least 2% by weight of the total alginate sol and preferably at just above 2%. Below this level the pectin is ineffective in preventing the tight, compact vegetable cellular structure from expanding into a more open, juicier, and generally more fruit-like cellular structure.

The addition of materials from the broad classes of degraded polysaccharides and sugars, starches, fats, gums and proteins has a general softening effect on the texture obtained by the afore-described dialysis process. These additives may be used at quantities up to about 25%. The exact amount used will be determined by the textural and taste effect desired. Most typically, however, these additives are employed at about a 2% level. Among the starches, the amylose and the lower starches appear somewhat unique in softening the cellular texture without any appreciable effect on crunchiness. Sugars, degraded polysaccharides, and particularly the corn syrup sweeteners have a significant softening effect on vegetable textures without influencing their crunchiness. Among the fats, coconut oil gives the greatest softening effect. In general, the softening effect increases as the various fats decrease in their congealing or solidification point.

In making vegetable textures the pH effect of acids should be controlled within a pH range of from about 4 to about 8 depending upon the desired end product. Below about pH 3.7 the hardness and speed of formation of the vegetable gels is definitely decreased while a pH of from about 8 to about 9 gives a bitter and an undesirable alkaline taste.

The formation of vegetable-like textures can best be illustrated by the following specific examples. In Examples 1–11 a 2-directional artificial dialysis cell was employed. This dialysis cell was prepared by placing 120 mm. of alginate sol in a glass ring 30 mm. in height having an inside diameter of 68 mm. The ring was fitted at its ends with a semi-permeable cellophane membrane, care being taken to avoid any air pockets between the alginate sol and the membrane. A glass container holding the calcium sol solution was superimposed onto the glass ring and a tight seal was accomplished by fitting melted wax or a suitable cement around the joint. The bottom of the glass ring was then placed in a large container of calcium acetate solution. In Example 12 no artificial membrane was used.

*Example 1*

A 2% solution of 500 cps. sodium alginate sol was prepared by adding dry sodium alginate to distilled water at room temperature in a Waring Blendor and agitating at a speed of 40 Variac. The speed was increased to 70 Variac and the solution mixed for one minute. The alginate sol was then deaerated to remove air pockets. A 5% solution of calcium acetate was prepared and brought to a boil to minimize the danger of mold growth, with care being taken to make up any water lost during evaporation. The solution was then cooled. Using a two-directional dialysis cell as described above, the calcium ions from the salt solution were allowed to diffuse at a slow and uniform rate in both up and downward directions into the alginate sol at room temperature for about 50 hours or until gelation was completed. The final gel was then removed, and washed with distilled water to give a final product which had the crunchiness and other essential textural characteristics of a natural cucumber.

*Example 2*

The process of Example 1 was followed after blending a 3% solution of low viscosity carboxymethyl cellulose in the alginate sol to attain a 1% by weight level of carboxymethyl cellulose based on the total weight of the alginate sol. The alginate was then gelled to achieve a final product resembling natural melon rind in textural qualities.

*Example 3*

The process of Example 1 was followed after blending a 3% solution of amylose into the alginate sol to obtain a 2% by weight level of amylose based on the total weight of the alginate sol. The amylose solution was heated under pressure to solubilize the amylose and cooled before addition to the alginate sol. The alginate sol was then gelled. The resulting gel was turnip-like in cellular texture and was very crunchy throughout the entire mastication process.

*Example 4*

The procedure of Example 1 was followed after blending a 3% solution of potato starch in order to obtain a 2% by weight level of potato starch based on the total weight of the alginate sol. The starch solution was heated to gelatinize the starch and then cooled slightly before addition to the alginate sol. The alginate sol was then gelled. An unripe avocado-like cellular network or texture resulted in the final product. The physical characteristics of softness and mealiness on mastication with little or no crunchiness were present.

*Example 5*

The procedure of Example 1 was followed after blending a 1% solution of gum tragacanth in order to obtain a 0.3% by weight level of gum tragacanth based on the total weight of the alginate sol. The gum tragacanth solution was prepared by mixing the gum with cold water in a Waring Blendor. The alginate sol was then gelled. An unripe melon-like texture resulted. The texture was softer than cucumber, while being slightly crisp and mealy in mouthfeel.

Example 6

The procedure of Example 1 was followed with 2% by weight level of sodium caseinate being obtained in the alginate sol after blending a 3% solution of caseinate into the alginate sol prior to gelation. The alginate sol was then gelled. A distinct vegetable textured product was produced which had an initial crunchy mouthfeel. The product became successively chewy and then mealy on mastication.

Example 7

The procedure of Example 6 was followed after blending a 3% solution of pectin into the alginate sol in order to obtain a 2.1% by weight level of pectin in the alignate sol prior to gelation. The alginate sol was then gelled. The distinct vegetable texture produced in Example 6 was preserved at a freezing temperature of 5° F. for several days without any discernible change in cellular or textural characteristics from the initial product. The product on thawing at room temperature had the same closed cellular structure and properties present in the initial texture.

In the manufacture of fruit texture according to the process of this invention, it is a preferred practice to deviate somewhat from the aforesaid procedure for making vegetable textures. It is therefore a feature of this process to react calcium lactate with the alginate sol after first adding suitable additives to the alginate and then subjecting the formed textures to a controlled or uniform freeze within the temperature range of −20° F. to +15° F. The lactate salt is preferable to the acetate in making fruit textures since the lactate gels are generally softer and exhibit more tender and moist cell walls after the freezing cycle than those formed under the influence of the acetate. While the lactate salt can be used within a permissible range of 1–12% concentration, about 5% is preferred and in turn the alginate sol should be within the range of 1% to 2% concentration and 500 to 900 cps. viscosity although 0.5% to 5% and 100 to 900 cps. is feasible.

Among the specific additives found useful in producing fruit-like textures is gum tragacanth, preferably at the level of from about 0.3% to about 1% by weight of the total alginate sol. It appears to have a significant effect in softening the cell walls and reducing the size of the cells after freezing and thawing. From about 0.2% to about 1% by weight of malic acid is advantageous in giving the products the proper pH, tartness, and flavor characteristics most similar to those in natural fruit materials. Other food acids such as citric, adipic, fumaric, etc. may also be employed in the same amount as the malic acid. Of the sugars, the corn syrup sweeteners, having a dextrose equivalent (DE) ranging from about 30 DE to about 65 DE, for example, Sweetose or Frodex, at about a 2% level by weight, are unique in reducing the cell size and increasing water retention by the cell wall so that the final freeze-thawed products are juicy, crunchy and very fruit-like in the overall mouthfeel. Starches without exception reduce the cell size and the toughness of the cell wall. However, at about the 2% level by weight starches have a tendency to give a somewhat cottony mouthfeel in the freeze-thawed product which is characterized by a chewy dryness. This may be eliminated by reducing the starch to about a 1% level. At this level the desired softening and cell size decreasing effects are maintained without the "cottony" effect. If freeze-resistant starches are employed, however, levels of up to about 5% to about 10% starch by weight will not cause this "cottony" effect. The proteins as a general class act also to reduce the cell size and the toughness. However, in the case of protein additives care must be taken to prevent fermentation during the sol formation period or pronounced off-tastes will occur. Gums as a general class are most beneficial in much the same manner as the corn syrup sugars, and the starches. Cell size is reduced and cell toughness decreased if used at about the 2% level. Fats on the other hand, increase the cell wall toughness to a degree proportional to the congealing or solidification point of the fat used. Fats as a general class can be used in fruit textures to improve the initial "bite." In this area coconut oil appears preferable and can be used within a concentration range of from about 1% to about 5% by weight of the alginate sol. At higher concentrations within this range the mealiness is increased together with the initial "bite" or crunchiness.

The formation of the fruit-like textures can be best illustrated by the following specific examples:

Example 8

Composition of the alginate sol is as follows:

| Ingredients: | Percent |
| --- | --- |
| Sodium alginate 500 cps. | 1.5 |
| gelatinized wheat starch | 1.1 |
| Sucrose | 5.7 |
| Malic acid | 0.5 |
| Apple flavor | q.s. |
| Water | 91.2 |
|  | 100.0 |

A 3% sodium alginate solution was prepared according to Example 1. The 3% starch suspension was made with distilled water and enough sugar to produce a 15% sucrose content. The solution was then heated to gelatinize the starch and cooled slightly. A 5% malic acid solution was prepared with cold distilled water. The final alginate sol was formed by mixing 60 gms. of 3% alginate sol, 46 gms. of sugar-starch paste and a suitable amount of apple flavoring. Then 14 gms. of malic acid was added last and mixed. The alginate sol was then gelled with 5% calcium lactate diffused at a slow and uniform rate while at room temperature. Dialysis was continued for 48 hours. The products were rinsed in cold water and then subjected to a uniform freeze at a temperature from −20° F. to +15° F. for about 12 hours with extreme care being taken not to freeze any portion of the gel faster than another. The products were wrapped in aluminum foil to avoid water evaporation and placed on insulated supports to prevent uneven freezing. A slow thaw at room temperature gave an apple-like texture which simulated the textural characteristics of natural apple. This texture could be refrozen several times and cooked at oven temperatures without loss of the characteristic apple crunchiness.

Example 9

| Ingredients: | Percent |
| --- | --- |
| Sodium alginate 900 cps. | 1.5 |
| Gelatinized wheat starch | 1.5 |
| Sucrose | 15.0 |
| Malic acid | 0.5 |
| Pear flavor | q.s. |
| Water | 81.5 |
|  | 100.0 |

A 3% sodium alginate solution was prepared similar to Example 7 except that 900 cps. alginate was used. An equivalent amount of sugar was added to a 10% starch suspension to obtain a solution 50% in sucrose and 5% in starch. The starch in the solution was gelatinized by heating and the solution was then cooled slightly. A 2.5% malic acid solution was prepared. The final alginate sol was made by mixing 60 gms. of the 3% alginate sol, 36 gms. of the sugar-starch solution and 24 gms. of the acid solution. The gel formation and the cold temperature treatment of the structure was the same as in Example 7. The cellular network produced simulated the textural characteristics of natural pears. The texture obtained could be cooked and re-frozen wtihout loss of these characteristics.

Example 10

Composition of the alginate sol was as follows:

| Ingredients: | Percent |
|---|---|
| Sodium alginate 500 cps. | 1.50 |
| Gum tragacanth | 0.50 |
| Malic acid | 0.24 |
| Watermelon flavor | q.s. |
| Color | 0.04 |
| Water | 97.72 |
|  | 100.00 |

The following solutions were made up: 3% sodium alginate, 3% gum tragacanth, 2% malic acid, and a 10% color solution. The final alginate sol was formed by adding 60 gms. of the 3% alginate sol to 30 gms. of the gum solution, 0.5 gm. of the color solution, 15.6 gms. of a suitable flavoring solution, and 14.4 gms. of the malic acid solution. The formation of the structure was the same as in Example 7. A watermelon-type cellular network was obtained which resembled natural watermelon in textural properties. This product could be refrozen and cooked without loss of textural properties.

Example 11

Composition of the alginate sol was as follows:

| Ingredients: | Percent |
|---|---|
| Sodium alginate 500 cps. | 1.50 |
| Gelatinized wheat starch | 1.00 |
| Sucrose | 15.00 |
| Malic acid | 0.25 |
| Water | 82.25 |
|  | 100.00 |

About 60 gms. of a 3% sodium alginate solution prepared according to Example 7 was added to 42 gms. gelatinized starch-sugar suspension containing 3% starch and 43% sugar. About 18 gms. of 1.7% malic acid solution was then added and mixed into the sol. Formation of the final structure was similar to Example 7. A honeydew cellular structure was obtained which resembled natural honeydew and could be cooked at oven temperatures and refrozen without loss of textural properties.

It will be clear to the skilled worker in this art that the dialysis production of artificial plant textures may be adapted to continuous production methods which may or may not use an artificial dialysis membrane at the start of the dialysis reaction. Therefore it is within the scope of this invention to extrude an ungelled alginate sol in the form of a ribbon, or a flat sheet, which is then gelled or reacted with an atomized spray of edible metal ions, such as calcium. The atomized spray must be adjusted to a rate which will form an initial film of the insoluble alginate gel at the surface of the alginate body. This thin film will then serve as a natural dialyzing membrane for metal ions reacting subsequently with the alginate.

Since the natural dialyzing film of insoluble alginate salt can only be formed where there is a clear and even interface between the two reacting solutions which supplies an even front of reacting ions, it will be appreciated that this essential film or membrane will not be obtained if the solutions are even slightly mixed with each other. Mixing of the two solutions at the interface results in an initial gel which is non-uniform and incapable of allowing uniform and controlled dialysis of the gelling ions into the alginate sol. This is the main reason for using the described artificial membranes to separate the two reacting solutions during the initial dialysis. However, it is clear that artificial dialysing membranes can also be used in continuous production methods where the alginate sol is extruded into a series of jackets, molds, or containers of semi-permeable membranes which can then be immersed by conventional conveyor means in a series of precipitation or reaction bath of gelling ions. In this manner the artificial membranes can also shape the gelled product into the final form desired.

Example 12

A watch glass was placed inside of a large glass dish. A 5% calcium lactate solution was poured into the watch glass in an amount sufficient to fill the watch glass. A glass ring having a diameter slightly less than the diameter of the watch glass was then placed on top of the watch glass. A sol having a viscosity of 500 cps. was next prepared by adding dry sodium alginate to distilled water in an amount sufficient to make up a 0.5% sodium alginate solution. A portion of this solution was very gently poured into the ring in such a fashion that a smooth and even interface existed at all times between the alginate sol and the calcium lactate solution. Immediately upon contact of the two solutions an insoluble film was formed at the interface of the solutions. Next, additional calcium lactate solution was poured into the dish surrounding the watch glass and glass ring to a level higher than the watch glass but lower than the top of the glass ring. This chamber served as a reservoir for the calcium lactate solution which could easily pass between the watch glass and the glass ring. The alginate sol did not leak out between the glass ring and the watch glass however, because of its high viscosity. The reaction was permitted to proceed for three days. The gel was then removed from the glass ring and subjected to a freezing and thawing cycle. The resulting product had a open, uniform, cellular srtucture. This example shows that it is not necessary to use an artificial dialysis membrane in preparing artificial fruits and vegetables in accordance with the invention.

While the production of artificial fruits and vegetable textures has been described by reference to specific examples, this is not intended to limit the invention, but reference should be had to the appended claims for a definition of the limits of this invention.

What is claimed is:

1. A process of making a product which simulates the texture of an edible plant-like material comprising:
   (a) forming an aqueous viscous solution of a water-soluble alginic acid salt, the concentration of said salt being from about 0.5% to about 5%,
   (b) contacting said water-soluble alginic acid salt solution with a solution containing edible alkaline earth metal ions without disturbing the interface between said solutions thereby forming an insoluble alginate film at said interface,
   (c) maintaining an even and uniform reacting interface between said solutions during the reaction period, and
   (d) continuing to react said ions with said alginic acid salt solution by diffusion of said ions through said insoluble alginate film at a constant and uniform rate whereby from about 3.5 mg. of calcium ions to about 11.5 mg. of calcium ions are bound to 1 gram of said viscous alginic acid salt per hour to a final calcium ion concentration of about 0.23 to about 0.67 equivalent of calcium per equivalent of alginate until the desired cellular structure is obtained.

2. A process according to claim 1 wherein the even and uniform reacting interface is maintained by means of an artificial dialysis membrane.

3. A process according to claim 1 wherein the alginic acid salt is sodium alginate and the calcium ions are supplied by a solution of calcium acetate salt having a concentration of from about 1% to about 12%.

4. A process according to claim 1 wherein the alginic acid salt is sodium alginate and the calcium ions are supplied by a solution of calcium lactate salt having a concentration of from about 1% to about 12%.

5. A process of making a product which simulates the texture of an edible plant-like material comprising:
   (a) forming an aqueous viscous sodium alignate solution, the solution having an alignate concentration of about 0.5% to about 5%, forming an aqueous solution of calcium ions having a concentration of about 1% to about 12%, contacting said two solutions by means of a dialysis membrane at the interface of said solutions, diffusing calcium ions through said membrane to form an insoluble calcium alignate film at said interface, and continuing to diffuse calcium ions through said membrane and said insoluble calcium alignate film at a constant and uniform rate whereby from about 3.5 mg. of calcium ions to about 11.5 mg. of calcium ions are bound to 1 gram of said viscous sodium alginate solution per hour to a final calcium concentration of about 0.61 to about 0.67 equivalent of calcium per equivalent of alginate.

6. A process according to claim 5 wherein the alginate sol is prepared from sodium alginate having an apparent viscosity of up to about 500 cps. and a concentration of about 2% to about 3%, the calcium ion solution being formed with calcium acetate and yielding a calcium ion concentration of about 3% to about 6%, the final product having a cellular structure similar to that of natural vegetable.

7. A process according to claim 5 wherein the alginate sol is prepared from sodium alginate having an apparent viscosity of about 500 cps. to about 900 cps. and a concentration of about 1% to about 2%, the calcium ion solution being formed with calcium lactate and yielding a calcium ion concentration of about 5%, and the plant-like cellular structure formed being subjected to a slow and uniform freezing at a temperature of below about 32° F. to produce a cellular structure similar to natural fruit.

8. A process according to claim 6 wherein the cellular vegetable texture is modified by the addition of about 0.2% to about 0.4% gum tragacanth based on total weight of alginate sol.

9. A process according to claim 6 wherein the alginate sol contains about 2% to about 5% pectin based on the total weight of the alginate sol and the vegetable texture is preserved at temperatures below about 32° F.

10. A process according to claim 6 wherein the cellular vegetable texture is modified by the addition to the alginate sol of up to about 25% of at least one ingredient selected from the group consisting of sugars, starches, fats, gums and proteins.

11. A process according to claim 7 wherein the slow and uniform freezing is carried out at a temperature between about −20° F. and about 15° F.

12. A process according to claim 11 wherein the cellular fruit texture is modified by the addition to the alginate sol of about 0.3% to about 1% gum tragacanth based on the total weight of the alginate sol.

13. A process according to claim 11 wherein the cellular texture is modified by the addition of up to about 2% starch based on the total weight of alginate sol.

14. A process according to claim 11 wherein the pH of the cellular fruit texture is adjusted by the addition of about 0.2% to about 1% malic acid based on the total weight of alginate sol.

15. A process according to claim 7 wherein the fruit textures are modified by the addition to the alginate sol of up to about 25% of at least one ingredient selected from the group consisting of sugars, starches, fats, gums and proteins.

16. An artificial vegetable comprising an edible, crisp, chewable, non-uniform network of calcium alginate cells, having included therein an artificial vegetable flavoring, the cell size varying from about 0.1 mm. to about 0.2 mm., the walls of said cells being non-birefringent.

17. An artificial vegetable according to claim 16 which has been modified by the addition of a member selected from the group consisting of sugars, starches, fats, gums and proteins in an amount up to about 25% of the total weight of the sol.

18. An artificial vegetable according to claim 16 which contains about 0.2% to about 0.4% gum tragacanth.

19. An artificial vegetable according to claim 16 which contains about 2% to about 5% pectin.

20. An artificial fruit comprising an edible, crisp, chewable, non-uniform network of calcium alginate cells, having included therein an artificial fruit flavoring, having a cell size of up to about 3 mm., at least 50% of said cells having a cell size from about 0.1 mm. to about 0.7 mm., the walls of said cells being birefringent.

21. An artificial fruit according to claim 20 which has been modified by the addition of a member selected from the group consisting of sugars, starches, fats, gums and proteins in an amount up to about 25% of the total weight of the sol.

22. An artificial fruit according to claim 20 which contains about 0.3% to about 1% gum tragacanth.

23. An artificial fruit according to claim 20 which contains up to about 5% starch.

24. An artificial fruit according to claim 20 which contains about 0.2 to about 1% of a food acidulant.

25. An artificial fruit according to claim 21 wherein said additive is a food sugar.

References Cited

UNITED STATES PATENTS 2,403,547  7/1946  Peschardt _____ 99—131

A. LOUIS MONACELL, *Primary Examiner.*

H. H. KLARE, *Assistant Examiner.*